May 4, 1926.
A. M. DEMUTH
1,583,396
COOKING APPARATUS
Original Filed April 15, 1925
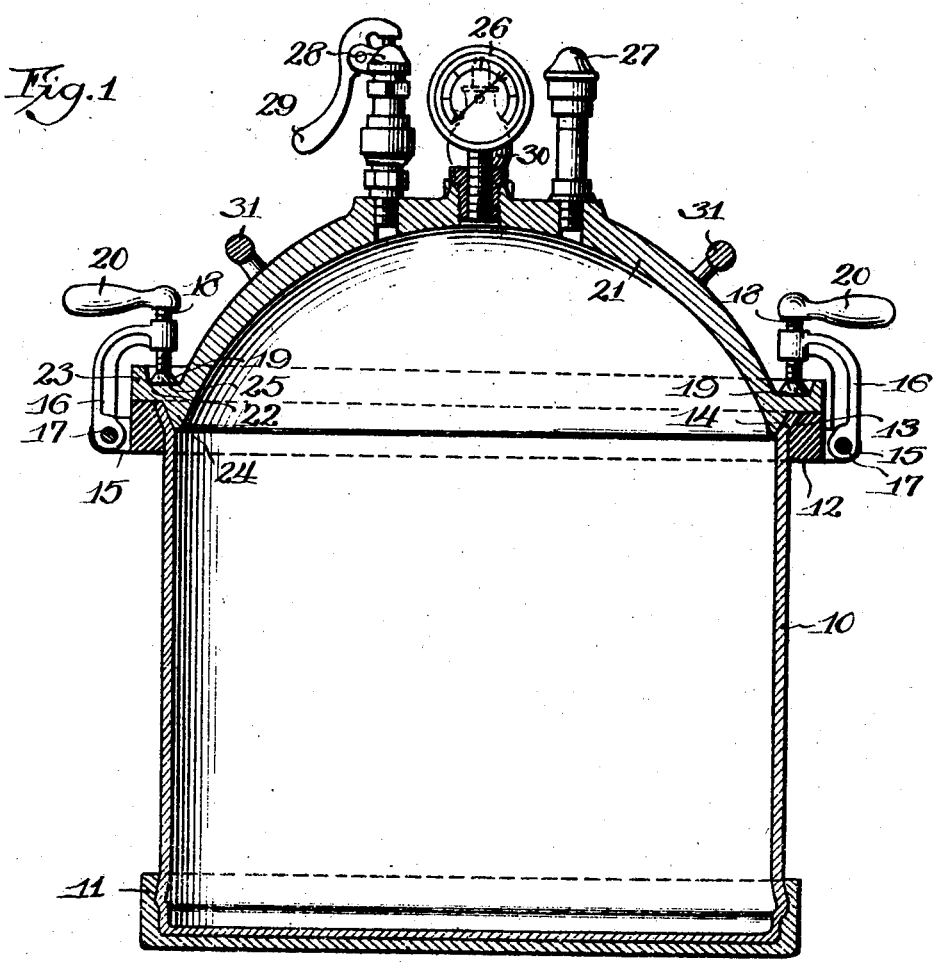
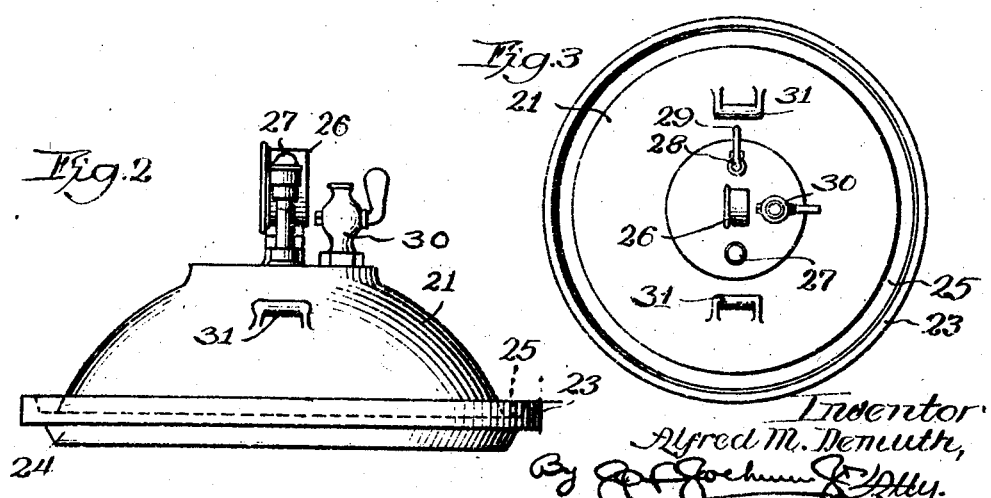
Inventor
Alfred M. Demuth, Patented May 4, 1926.

1,583,396

UNITED STATES PATENT OFFICE.

ALFRED M. DEMUTH, OF CHICAGO, ILLINOIS.

COOKING APPARATUS.

Original application filed April 15, 1925, Serial No. 23,203. Divided and this application filed October 19, 1925. Serial No. 63,264.

*To all whom it may concern:*

Be it known that I, ALFRED M. DEMUTH, a citizen of the United States, residing at Chicago, in the county of Cook and State of Illinois, have invented certain new and useful Improvements in Cooking Apparatus, of which the following is a specification.

This application is a division of my application Serial Number 23203, filed April 15, 1925, and relates to improvements in cooking apparatus and more specifically to the type known as pressure cookers, in which articles of food are hermetically sealed and are cooked by the pressure of the steam or vapors formed in the receptacle.

It has been found that in apparatus of this character in which the cover is secured in position by means of clamps which are pivotally connected to the body of the receptacle and which clamps are provided with clamping screws that swing over the edge and engage and rest upon the cover adjacent its periphery, the clamping screws as they are tightened have a tendency to and in many instances do slip, and frequently to such an extent that they oftentimes entirely slip off of the cover.

It has also been found that with cookers of this character which are provided with a vapor escape outlet through the cover, the products of condensation will settle upon and run down the outside of the cover and the wall of the cooker, with the result that in time the apparatus becomes stained and marred.

It is one of the objects of the present invention to overcome these difficulties and objections and to provide in an apparatus of this character improved means for preventing the clamping screws from slipping when they are brought into contact with the cover, and at the same time the cover may be placed upon the vessel or receptacle in any position.

A further object is to provide in an apparatus of this character an improved cover having a trough like formation on the exterior and encompassing the periphery thereof for catching and retaining the products of condensation to prevent them from running down the outer face of the wall of the cooker and thereby prevent said wall from becoming stained or marred.

A further object is to provide in an improved apparatus of this character means whereby the pressure may be relieved from the interior of the cooker to permit the escape of vapor so that when the cover is removed all danger of the user becoming burned with the hot vapor or steam will be obviated.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a vertical, longitudinal sectional view of a cover of this character constructed in accordance with the principles of this invention.

Figure 2 is a right hand side elevation of the cover.

Figure 3 is a top plan view of the cover.

Referring more particularly to the drawing the numeral 10 designates generally a receptacle which may be of any desired size and configuration and is preferably constructed of sheet material formed into shape.

Secured to the bottom of the receptacle thus formed is a protecting base 11 which is constructed of a material somewhat heavier than the material from which the body of the receptacle is constructed and is secured in position in any suitable manner. The construction and use of this re-enforcing bottom, however, constitutes the subject matter of my co-pending application heretofore referred to.

Encompassing the receptacle at the top thereof is a band or collar 12 constructed of any suitable material and is secured in position in any suitable manner so that the top thereof will be flush with the top of the receptacle wall.

The upper and inner face of this band is preferably cut away or beveled as at 13 so that the upper extremity of the wall of the receptacle may be deflected as at 14, such as by spinning or the like, against the cut away portion 13 which assists in securing the parts together.

This band or collar is provided with a plurality of spaced ears or projections 15, any number of pairs of which may be provided according to the number of clamps that it is desired to employ. A plurality of clamping members 16 are provided and each of the clamping members is pivotally connected as at 17 by one extremity between co-operating ears 15. A screw 18 is threaded into the end of each of the clamping members and the screw is provided with an enlarged extremity or head 19 which is preferably swiveled to the end of the screw, and a handle 20 at the other end by means of which the screw may be adjusted with respect to the clamping member and by means of which the clamping member may also be swung about its pivot 17.

A cover 21 is provided for the receptacle and this cover may be of any desired configuration but is preferably of a dome like construction, the base of which is shaped to form a circumferential flat portion 22 having an upstanding peripheral flange 23 extending about the cover to form an open trough like receptacle encompassing the cover.

Depending below the bottom of the flange 23 is a portion 24, the outer face of which is preferably beveled or inclined to conform to the shape of the portion 14 of the top of the receptacle wall and this portion 24 serves as a pilot or guide for seating the cover and also assists in forming a fluid tight joint.

The portion 22 of the cover is adapted to rest upon the upper edge of the wall of the receptacle and of the collar 12, and when in position the clamps 16 may be swung about their pivots to the position shown in Figure 1, so that the end 19 of the screws 18 will pass over the flange 23 and will enter the trough like formation on the cover to engage the base thereof. The base 25 of this trough like formation is preferably flat. When the clamps are in this position the screws 18 may be adjusted by means of the respective handles 20 so that the head 19 of the screws will co-operate to clamp the cover 21 in position.

To remove the cover the screws 18 are adjusted in the opposite direction for a distance sufficient to permit the ends 19 of the screws to swing over the flange 23.

A pressure gauge 26, an air vent 27 and a safety blow off valve 28, having a control lever 29 may be provided in the cover 21 and each has communication with the interior of the receptacle.

Connected also with the cover 21 is a suitable valve device 30, such as a pet cock or the like, which has communication with the interior of the receptacle and is adapted to be opened so as to permit the escape of vapor or steam.

The cover 21 is provided with suitable handles 31.

After the cooking operation is completed and before the cover is removed the pet cock 30 may be opened to permit of the escape of the hot vapors or steam from within the receptacle and may be allowed to remain open while the cover is being removed.

This will obviate the danger of the operator burning or scalding his hands while removing the cover after the cooking operation has been completed.

It has been found in devices of this character that when the vapor or steam is allowed to escape from the receptacle it condenses and the water of condensation drops back upon the outer face of the cover 21 and will in devices of this character heretofore made, run down the outside of the receptacle, with the result that in time the receptacle becomes marred or stained.

By providing the trough like formation which encompasses the periphery of the cover, the products of condensation will be collected and will accumulate in the trough and will thereby be prevented from running down the outer face of the receptacle.

When the clamping members are in position to secure the cover upon the receptacle they will be held from slipping with respect to the cover by reason of the fact that the heads 19 of the screws 18 enter the trough and engage the bottom thereof. The diameter of the heads 19 is preferably such as to substantially fill the adjacent portion of the trough so as to insure the clamping members against slipping.

While the preferred form of the invention has been herein shown and described it is to be understood that various changes may be made in the details of construction and in the combination and arrangement of the several parts, within the scope of the claims, without departing from the spirit of this invention.

What is claimed as new is:

1. A cooking vessel, a cover therefor, an upwardly projecting continuous flange extending about the periphery of the cover, a portion of the outer face of the cover adjacent and within said flange and below the top of the flange being shaped to form a continuous flat surface encompassing the cover, a plurality of clamping members pivotally connected with the receptacle and adapted to project over said flange, a screw threaded through each of the clamping members and having a flat bearing surface at one end to engage over the flat surface within the flange, and handles connected with each of the screws for operating them and for swinging the respective clamping members about their pivots.

2. A cooking vessel, a cover therefor, an upwardly projecting continuous flange extending about the periphery of the cover, a portion of the outer face of the cover adjacent and within the flange and below the top of the flange being shaped to form a continuous flat surface encompassing the cover, a band encompassing and secured to the body of the receptacle, a plurality of clamping members pivotally connected with the said band and adapted to project over said flange, a screw threaded through each of the clamping members and having a flat bearing surface at one end to engage the said flat surface within the flange, and handles connected with each of the screws for operating them and for swinging the respective clamping members about their pivots.

3. A cooking vessel, a cover therefor, an upwardly projecting continuous flange extending about the periphery of the cover, a portion of the outer face of the cover adjacent and within the flange and below the top of the flange being shaped to form a continuous flat surface encompassing the cover, a band encompassing and secured to the body of the receptacle, a plurality of clamping members pivotally connected with the said band and adapted to project over said flange, a screw threaded through each of the clamping members and having a flat bearing surface at one end to engage the flat surface within the flange, and handles connected with each of the screws for operating them and for swinging the respective clamping members about their pivots, the top of the said band being flush with the top of the wall of the receptacle to form a flat supporting surface for the cover to rest upon.

4. A cooking vessel, a cover therefor, an upwardly projecting continuous flange extending about the periphery of the cover, a portion of the outer face of the cover adjacent and within the flange and below the top thereof being shaped to form a continuous flat surface encompassing the cover, a plurality of clamping members pivotally connected with the receptacle and adapted to project over said flange, a screw threaded through each of the clamping members and having a flat bearing surface at one end to engage the flat surface within the flange, handles connected with each of the screws for operating them and for swinging the respective clamping members about their pivots, and means for permitting the escape of vapor through the cover.

5. A cooking apparatus, a cover therefor, an upwardly projecting continuous flange extending about the periphery of the cover, a portion of the outer face of the cover adjacent and within said flange and below the top of the flange being shaped to form a continuous flat surface encompassing the cover, a plurality of clamping members pivotally connected with the receptacle and adapted to project over said flange, a screw threaded through each of the clamping members and having a flat bearing surface at one end to engage over the surface within the flange, handles connected with each of the screws for operating them and for swinging the respective clamping members about their pivots, there being an opening through the cover to permit the escape of vapor, and a valve device for controlling said opening.

6. A cooking vessel, a cover therefor, a continuous trough like formation encompassing the periphery of the cover, a plurality of clamping members pivotally connected with the vessel and adapted to swing over the said trough, fastening members individual to the clamping members and adjustable with respect thereto, one end of each of said fastening members engaging and resting upon the bottom of the said trough for securing the cover in position, and handles connected with the fastening members for operating them.

7. A cooking vessel, a cover therefor, a continuous trough like formation encompassing the periphery of the cover, a plurality of clamping members pivotally connected with the vessel and adapted to swing over the said trough, fastening members individual to the clamping members and adjustable with respect thereto, one end of said fastening members engaging and resting upon the bottom of the said trough for securing the cover in position, handles connected with the fastening members for operating them, there being a vapor outlet opening through the cover, and a valve device for controlling said outlet.

In testimony whereof I have signed my name to this specification, on this 16th day of October, A. D. 1925.

ALFRED M. DEMUTH.